(12) United States Patent
Choi

(10) Patent No.: US 11,741,049 B2
(45) Date of Patent: Aug. 29, 2023

(54) APPARATUS FOR MANAGING FOLDER AND METHOD FOR THE SAME

(71) Applicants: DELTA PDS CO., LTD., Seoul (KR); Jae Ho Choi, Seoul (KR)

(72) Inventor: Jae Ho Choi, Seoul (KR)

(73) Assignees: DELTA PDS CO., LTD., Seoul (KR); Jae Ho Choi, Seoul (KR)

(*) Notice: Subject to any disclaimer, the term of this patent is extended or adjusted under 35 U.S.C. 154(b) by 0 days.

(21) Appl. No.: 17/841,170

(22) Filed: Jun. 15, 2022

(65) Prior Publication Data

US 2022/0309038 A1    Sep. 29, 2022

Related U.S. Application Data

(63) Continuation of application No. 16/209,390, filed on Dec. 4, 2018, now Pat. No. 11,392,548.

(30) Foreign Application Priority Data

| Dec. 5, 2017 | (KR) | 10-2017-0165758 |
|---|---|---|
| Jan. 8, 2018 | (KR) | 10-2018-0002417 |
| Jan. 15, 2018 | (KR) | 10-2018-0005033 |
| Oct. 18, 2018 | (KR) | 10-2018-0124610 |
| Oct. 18, 2018 | (KR) | 10-2018-0124625 |
| Nov. 2, 2018 | (KR) | 10-2018-0133210 |

(51) Int. Cl.
| G06F 16/00 | (2019.01) |
| G06F 16/16 | (2019.01) |
| G06F 16/17 | (2019.01) |
| G06F 16/13 | (2019.01) |

(52) U.S. Cl.
CPC ............ *G06F 16/164* (2019.01); *G06F 16/13* (2019.01); *G06F 16/17* (2019.01)

(58) Field of Classification Search
CPC ........ G06F 16/164; G06F 16/17; G06F 16/13; G06F 16/176; G16F 16/168
See application file for complete search history.

(56) References Cited

U.S. PATENT DOCUMENTS

| 10,963,158 B2 | 3/2021 | Dascola et al. |
| 2007/0143354 A1 | 6/2007 | Morooka |
| 2013/0262534 A1 | 10/2013 | Hayakawa |
| 2016/0077758 A1 | 3/2016 | Carter et al. |
| 2017/0046024 A1 | 2/2017 | Dascola et al. |

(Continued)

FOREIGN PATENT DOCUMENTS

| JP | 2004-062780 A | 2/2004 |
| JP | 2007-065926 A | 3/2007 |
| JP | 2007-233661 A | 9/2007 |

(Continued)

*Primary Examiner* — Tyler J Torgrimson
(74) *Attorney, Agent, or Firm* — Paratus Law Group, PLLC

(57) ABSTRACT

An apparatus for managing a folder, includes: a memory; and a processor electrically connected to the memory. The processor is configured to detect access of a user terminal, provide a folder list for folders or a file list for files in the folder, and when an access authority of the user terminal to the folder is confirmed, display some or all of message threads input from chat room participants through a realized folder chat room in association with the folder in the user terminal.

14 Claims, 8 Drawing Sheets

(56) References Cited

U.S. PATENT DOCUMENTS

2018/0285405 A1* 10/2018 Chan .................. G06F 16/1734

FOREIGN PATENT DOCUMENTS

| | | |
|---|---|---|
| JP | 2012-118670 A | 6/2012 |
| JP | 2015-041335 A | 3/2015 |
| JP | 2015-153257 A | 8/2015 |
| KR | 10-1169801 B1 | 7/2012 |
| KR | 10-2016-0030462 A | 3/2016 |
| KR | 10-2017-0063994 A | 6/2017 |
| KR | 10-2018-0089368 A | 8/2018 |
| WO | WO 2016/132717 A1 | 8/2016 |

* cited by examiner

|  | User A | User B | User C |
|---|---|---|---|
| Folder 1 | Generation time 2017.10.25, 18:13:07<br>Modified time 2017.10.25, 18:13:07<br>Access time 2017.10.25, 18:13:07 | Generation time<br>-<br>Modified time<br>-<br>Access time 2017.10.26, 11:15:42 | Generation time<br>-<br>Modified time<br>-<br>Access time<br>- |
| Folder 2 | Generation time<br>-<br>Modified time 2017.10.22, 09:43:20<br>Access time 2017.10.22, 09:43:20 | Generation time 2017.10.21, 12:08:51<br>Modified time<br>-<br>Access time<br>- | Generation time<br>-<br>Modified time 2017.10.25, 11:08:22<br>Access time 2017.10.25, 11:08:22 |
| Folder 3 | Generation time<br>-<br>Modified time<br>-<br>Access time 2017.10.23, 17:18:30 | Generation time<br>-<br>Modified time 2017.10.25, 18:30:19<br>Access time 2017.10.25, 18:30:19 | Generation time 2017.10.23, 14:00:03<br>Modified time 2017.10.24, 10:32:08<br>Access time 2017.10.24, 10:32:08 |

(b)

|  | User A | User B | User C |
|---|---|---|---|
| Folder 1 | Folder badge 0 | Folder badge 0 | Folder badge 1 |
| Folder 2 | Folder badge 1 | Folder badge 2 | Folder badge 0 |
| Folder 3 | Folder badge 2 | Folder badge 0 | Folder badge 1 |

US 11,741,049 B2

APPARATUS FOR MANAGING FOLDER AND METHOD FOR THE SAME

CROSS-REFERENCE TO PRIOR APPLICATIONS

This application is a continuation of U.S. patent application Ser. No. 16/209,390 (filed on Dec. 4, 2018), which claims priority to Korean Patent Application Nos. 10-2017-0165758 (filed on Dec. 5, 2017), 10-2018-0002417 (filed on Jan. 8, 2018), 10-2018-0005033 (filed on Jan. 15, 2018), 10-2018-0124610 (filed on Oct. 18, 2018), 10-2018-0124625 (filed on Oct. 18, 2018), and 10-2018-0133210 (filed on Nov. 2, 2018), which are all hereby incorporate by reference in their entirety.

BACKGROUND

The present invention relates to a folder management technique, and more specifically, to a technique for providing a notification to a user using a badge.

A folder sharing technique implements folders which can be used by two or more users and can provide a function of uploading or downloading files requested by two or more users. As the number of users who use folder sharing programs increases, a variety of file sharing applications for efficiently providing folder sharing processes between various users are developed.

SUMMARY

The present invention relates to a folder management apparatus and method for intuitively notifying a user of a shared folder and unchecked details accumulated in the shared folder, thereby improving user convenience.

An embodiment of the present invention provides a folder management apparatus and method capable of intuitively notifying a user of folder update made by other users by managing shared folders and files in the shared folders using the concepts of a folder badge per user per folder and a file badge per user per file, thereby improving user convenience.

According to one embodiment of the present invention, there is provided a folder management apparatus including a memory and a processor electrically connected to the memory, wherein the processor is configured to detect access of a user terminal and to display at least one folder permitted to be accessed by the user terminal along with a folder badge corresponding to the folder, wherein, when update histories including modification and new generation with respect to the folder permitted to be accessed by the user terminal are generated, the folder badge indicates the number of update histories which have not been yet read by the user terminal among the update histories.

BRIEF DESCRIPTION OF THE DRAWINGS

FIG. 6 is a diagram illustrating an embodiment of a procedure in which a folder badge manager of the present invention manages folder update history using a sequential list vectorized in time series.

DETAILED DESCRIPTION

Figure 1:
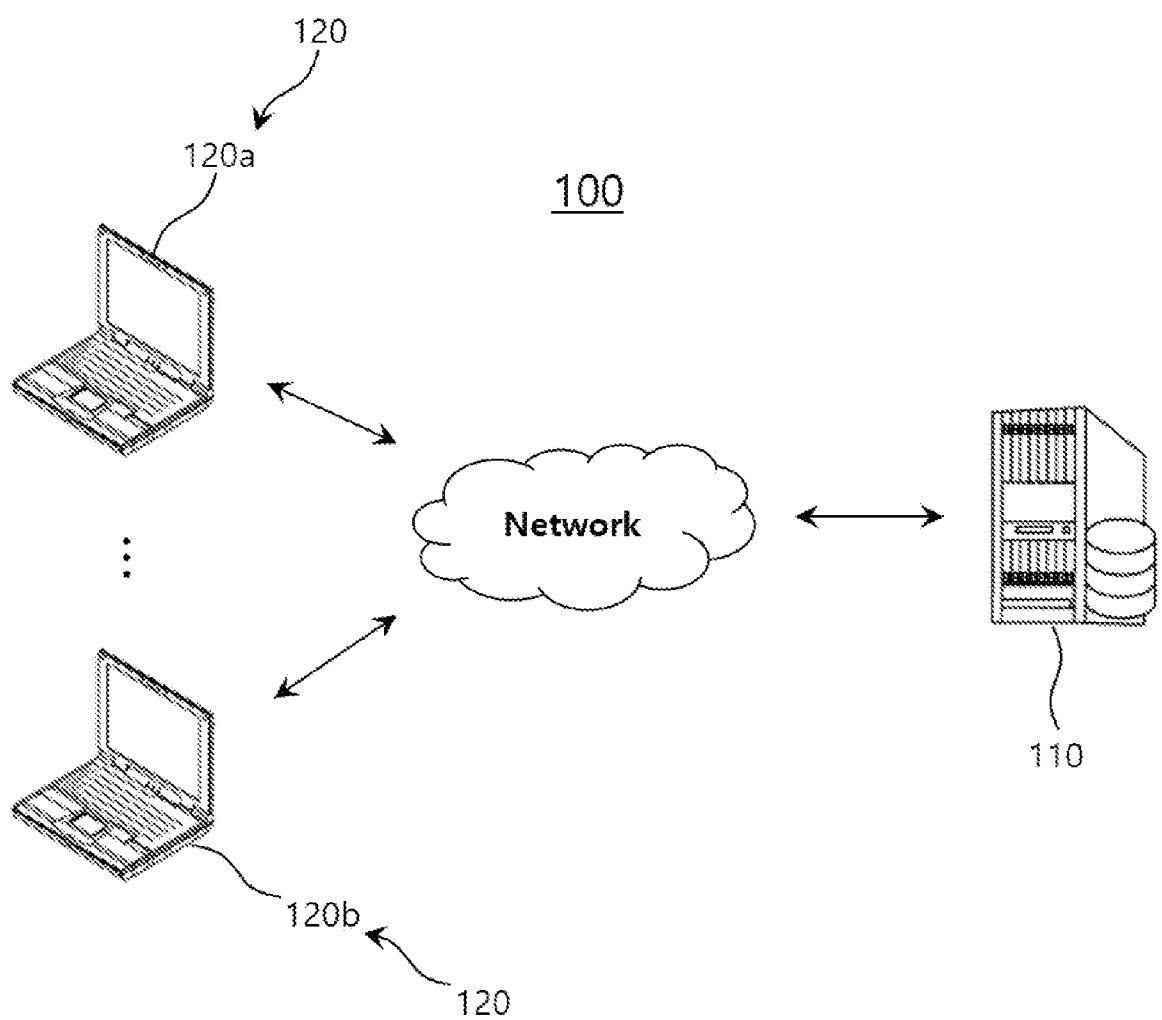
FIG. 1 is a diagram illustrating a folder management system according to an embodiment of the present invention.

Description of the present invention is merely an embodiment for structural or functional explanation and thus the scope of the present invention should not be interpreted as being limited by embodiments described in the specification. That is, embodiments can be modified in various manners and have various forms and thus the scope of the present invention should be understood to include equivalents that can realize the technical ideas. In addition, the objectives and effects proposed in the present invention are not intended to be included in a specific embodiment or only the effects are not intended to be included therein and thus the scope of the present invention should not be understood to be limited thereby.

Meanwhile, the terms used in the present application should be understood as follows.

Terms such as "first" and "second" are used to distinguish one component from another component and the scope of the present invention is not limited by such terms. For example, a first element may be called a second element and the second element may be called the first element.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements. Further, other expressions for describing a relationship between elements, that is, "between", "directly between", "adjacent to", "directly adjacent to" and the like should be interpreted in the same manner.

An element described in the singular form is intended to include a plurality of elements unless the context clearly indicates otherwise. In addition, in the specification of the present invention, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

In the method invention, steps may be performed in different order from the described order unless the context clearly indicates otherwise. That is, steps may be performed in the same order as the described one, performed substantially simultaneously or performed in reverse order.

The present invention can be implemented with computer-readable code in a computer-readable recording medium, and the computer-readable recording medium may include all kinds of recording devices capable of storing data readable by a computer system. Examples of the computer-readable medium may include a ROM, a RAM, a CD-ROM, magnetic tapes, floppy disks, optical data storage devices, and the like. Further, the computer-readable recording medium is distributed to a computer system connected via a network and computer-readable code can be saved and executed according to a distributed system.

It is to be noted that most terms disclosed in the present invention correspond to general terms well known in the art. Terms defined in generally used dictionaries should be interpreted as being consistent with contextual meanings of related art and cannot be interpreted as having ideal or excessively formal meanings unless clearly defined in the present application.

FIG. 1 is a diagram illustrating a folder management system according to an embodiment of the present invention.

Referring to FIG. 1, a folder management system 100 includes a folder management apparatus 110 and one or more user terminals 120.

The folder management apparatus 110 corresponds to a computing device which can be connected to at least one user terminal 120 through a network. In an embodiment, the folder management apparatus 110 may manage at least one member group in which a user associated with the user terminal 120 is included as a member.

In an embodiment, the folder management apparatus 110 may be connected to the user terminal 120 through a shared folder agent installed in the user terminal 120. Here, the shared folder agent corresponds to an agent program which is software capable of allowing the user terminal 120 and the folder management apparatus 110 to inter-operate with the permission of the user terminal 120 when installed in the user terminal 120.

The user terminal 120 corresponds to a computing device connectable to the folder management apparatus 110 through a network, for example, a desktop computer, a notebook computer, a tablet PC, a smartphone or the like.

In an embodiment, a first user terminal 120a may correspond to a mobile terminal and may be connected to the folder management apparatus 110 through cellular communication or Wi-Fi communication. In another embodiment, a second user terminal 120b may correspond to a desktop computer and may be connected to the folder management apparatus 110 through the Internet.

Figure 2:
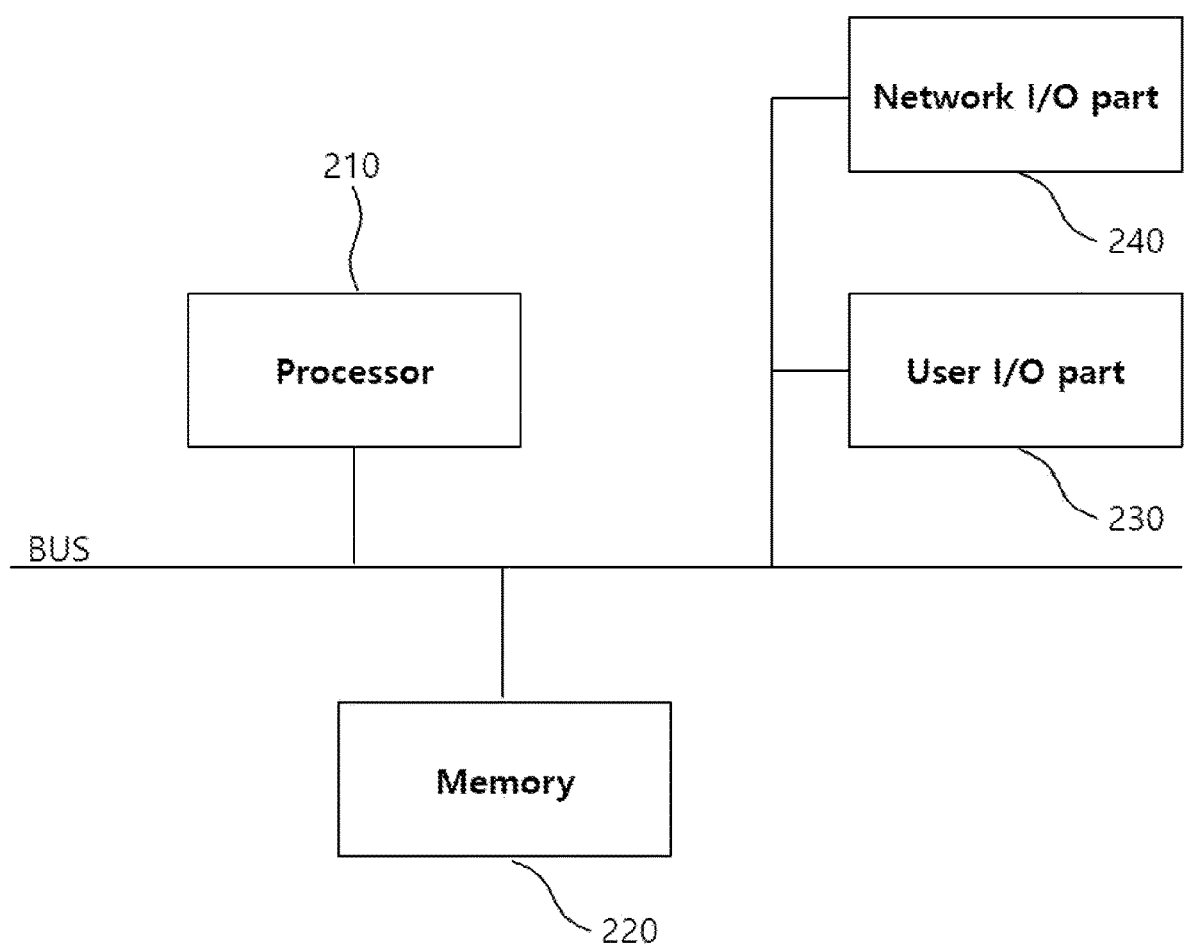
FIG. 2 is a block diagram showing a folder management apparatus according to an embodiment of the present invention.

FIG. 2 is a block diagram showing the folder management apparatus according to an embodiment of the present invention.

Referring to FIG. 2, the folder management apparatus 110 may include a processor 210, a memory 220, a user input/output unit 230 and a network input/output unit 240.

The processor 210 can execute a shared folder management process according to an embodiment of the present invention, manage the memory 220 for which writing or reading is performed in the process and schedule synchronization time between a volatile memory and a nonvolatile memory in the memory 220.

The processor 210 can control the overall operation of the folder management apparatus 110 and can be electrically connected to the memory 220, the user input/output unit 230 and the network input/output unit 240 to control data flow therebetween. The processor 210 may be realized by a central processing unit (CPU) of the folder management apparatus 110.

The memory 220 may include an auxiliary storage device which is implemented by a nonvolatile memory such as a solid state disk (SSD) or a hard disk drive (HDD) and used to store data necessary for the folder management apparatus 110 and a main storage device implemented by a volatile memory such as a random access memory (RAM). In this manner, the memory 220 can be implemented by a volatile memory and a nonvolatile memory. If the memory 220 is implemented by a nonvolatile memory, the memory 220 can be implemented to be connected through a hyperlink.

The user input/output unit 230 may provide an environment for receiving user input and an environment for outputting specific information to a user and include an input device including an adaptor such as a mouse, a trackball, a touchpad, a graphic tablet, a scanner, a touchscreen, a keyboard or a pointing device and an output device including an adaptor such as a monitor or a touchscreen. In an embodiment, the user input/output unit 230 may correspond to a computing device connected through remote access. In such a case, the folder management apparatus 110 can serve as a server.

The network input/output unit 240 may provide an environment for connecting to the user terminal 120 through a network and include an adaptor for local area network (LAN) communication, for example.

Figure 3:
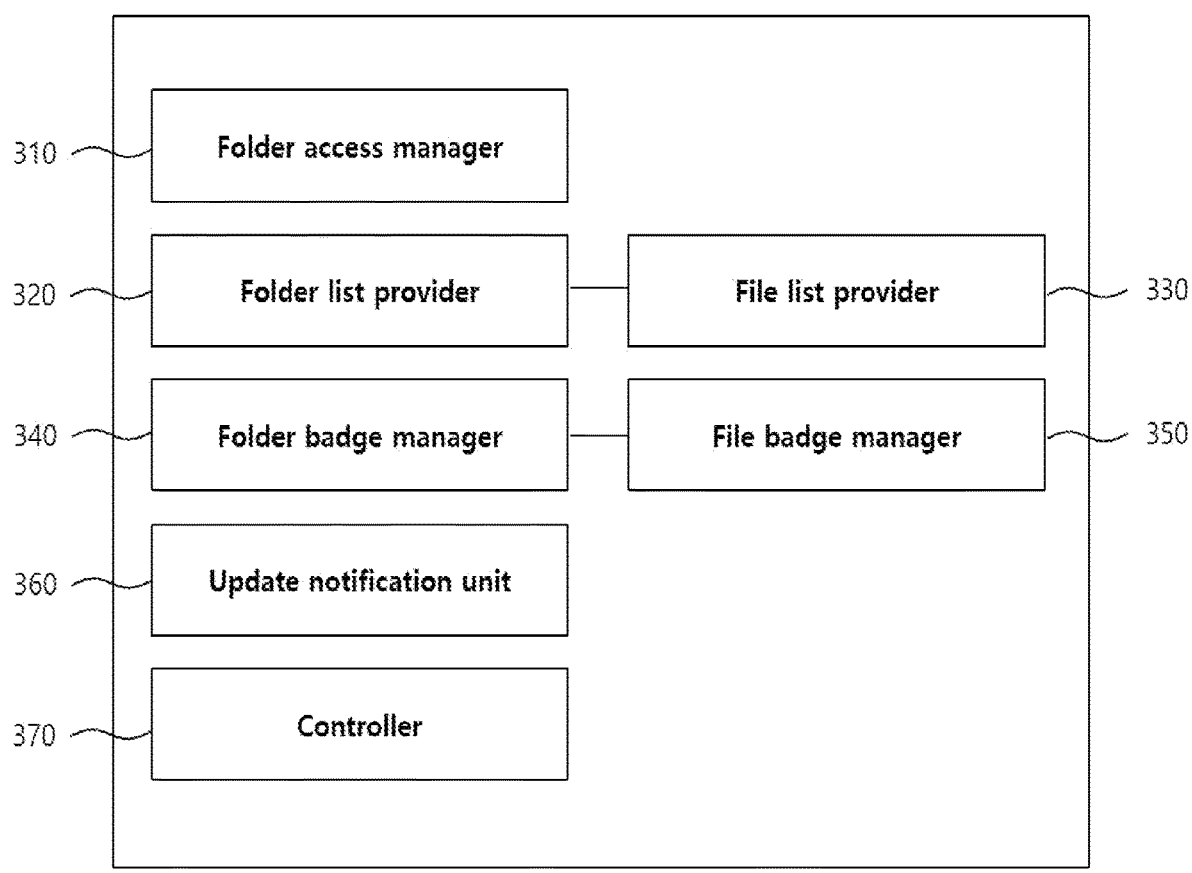
FIG. 3 is a block diagram showing functional elements of a processor included in the folder management apparatus according to an embodiment of the present invention.

FIG. 3 is a block diagram showing functional elements of the processor included in the folder management apparatus according to an embodiment of the present invention.

Referring to FIG. 3, the processor 210 may include a folder access manager 310, a folder list provider 320, a file list provider 330, a folder badge manager 340, a file badge manager 350, an update notification unit 360 and a controller 370.

However, the processor 210 according to an embodiment of the present invention does not necessarily include all of the aforementioned components simultaneously and some of the components may be omitted or some or all of the component may be selectively included in the processor 210 according to embodiments.

When the user terminal 120 accesses or intends to access a folder management system or a folder, the folder access manager 310 receives a request of access of the user terminal 120. More specifically, the folder access manager 310 can receive a request of access to the folder management system or a specific folder from the user terminal 120, check the access authority of the corresponding user and determine whether to permit the access.

Here, the folder access manager 310 can check the authority of the user terminal 120 to access a folder by acquiring user information associated with the user terminal 120 or identification information of the user terminal. The folder access manager 310 can permit access only when it is confirmed that the corresponding user or corresponding user terminal has the authority to access the folder management system or the folder.

In an embodiment, presence or absence of the authority to access a folder may be determined through user invitation performed by a folder generator when the folder is generated. That is, only a user invited by the folder generator to the corresponding folder has the authority to access the folder.

The folder access manager 310 can perform management such as adding, modifying or deleting a file or a subfolder with respect to a folder on the basis of a request of a folder user. Here, a file may include text files transmitted from the user terminal 120 or general user files such as a multimedia file.

The folder list provider 320 provides a folder list only when the folder access manager 310 confirms that the corresponding user terminal 120 has the access authority. Here, folders in a provided list may be limited to folders confirmed to be accessible by the corresponding user terminal 120. Further, the folder list provider 320 may provide a folder badge corresponding each folder along with the folder list.

The folder list provider 320 may include a folder manager (not shown). The folder manager can generate and manage folders. More specifically, the folder manager can generate a folder on the basis of a user request, generate a subfolder in the folder and manage the subfolder.

In an embodiment, the folder manager can generate a specific folder designated with a folder generator by a user associated with the corresponding user terminal 120 when a folder generation request is received from the user terminal 120. In addition, the folder manager can invite folder sharers according to designation of the folder generator and determine at least one folder sharer participating in the corresponding folder.

In an embodiment, when a folder is generated by a folder generator, the folder manager can assign access authority of the folder generator including folder deletion authority to the folder generator and assign access authority of a folder sharer from which the folder deletion authority has been excluded to each folder participant.

The file list provider 330 can provide a list of files in a specific folder when the user terminal 120 accesses and opens the specific folder. Here, a file list can be provided with respect to only files for which the user terminal 120 has the access or reading authority. In addition, the file list provider 330 can provide a file badge per user per file to each user along with the file list.

Here, a file can include all types of objects such as text, still images, moving images, tables and audio data stored in folders or accessible through folders. Further, a file can include a folder memo associated with a corresponding folder, a task object stored in a corresponding folder, accessible through the folder or associated with a file in the folder, a file associated with a task object, and the like.

Particularly, a file badge with respect to a folder memo pad may be designated as a file badge or a folder memo badge. Similarly, a file badge with respect to a folder chat room may be designated as a file badge or a folder chat room badge and a file badge with respect to a task object may be designated as a file badge or a task object badge.

In addition, when a task object, a folder memo pad and a folder chat room are associated with a file, update histories generated in the task object, the folder memo pad and the folder chat room may also be reflected in the file badge of the file associated therewith and the folder badge of a folder associated therewith.

In an embodiment, the folder list provider 320 can provide a list of subfolders in a specific folder and metadata about the subfolders when the user terminal 120 is permitted to access the specific folder through the folder access manager 310 and also provide subfolder badges corresponding to the subfolders. In addition, the file list provider 330 can provide metadata about a file in the folder and a file list including an access path to the file to the user terminal 120 permitted to access the folder by the folder access manager 310 and the folder list provider 320.

More specifically, when the user terminal 120 is permitted to access a folder by the folder access manager 310, the folder list provider 320 can provide i) metadata about subfolders in the folder and ii) a folder badge per user per folder including information about modification performed by each folder user participating in the folder with respect to each subfolder in the folder to the user terminal 120.

In addition, when the user terminal 120 is permitted to access a specific folder by the folder access manager 310, the folder list provider 320 can provide i) a file list including metadata about a file in the folder and ii) a file badge per user per file including information about modifications performed by each folder user participating in the folder with respect to each file in the folder and having the authority to modify the file to the user terminal 120.

The folder badge manager 340 generates, computes and updates folder badges using folder update histories and user access information. Here, a folder may include a subfolder. In addition, the file badge manager 350 generates, computes and updates file badges using update histories of files in folders and user access information. In addition, a file badge value can be added to a folder badge value of a folder to which the corresponding file belongs.

A folder badge represents update histories with respect a specific folder. The update histories include new generation or changes in settings and modification of the specific folder, upload and/or modification of a file in the specific folder, addition and change of a file in the specific folder, new generation or changes in settings of a subfolder in the specific folder, and update histories generated with respect to a file in the subfolder. However, a folder badge value according to an embodiment of the present invention represents only the number of accumulated update histories which are not checked by a specific user instead of the number of all accumulated update histories due to the aforementioned events.

A file badge represents the number of unchecked update histories which have not been yet read or checked by a user among the number of accumulated update histories with respect to a specific file when the update histories are generated. The update histories include events such as upload and/or modification, addition, change and update of the specific file. That is, in an embodiment of the present invention, a folder badge or a file badge can represent the number of unchecked update histories of a specific user among update events i included in the update histories with respect to the specific user.

Accordingly, folder badges are recorded per folder and counted, recorded and visualized per user. This is because, when a plurality of users participates in folder sharing, folders which have been open or have not been open by the users, files which have been read or have not been read by the users and update histories of folders and files are different. Accordingly, a folder badge may be an index which quantifies and indicates details required to be read and checked later by a specific user with respect to a specific folder.

For example, a folder badge per user per folder may be described as follows. If a folder management system includes folder 1 and folder 2 and folder users A and B, modification and update information about folder 1 and folder 2 and read information about folder 1 and folder 2 of each of user A and user B can be represented.

That is, when folder 1 is newly generated as a folder accessible by user A, a folder badge value of folder 1 is 1. When new file 1-1 is generated in folder 1, the folder badge value of folder 1 becomes 2. When user A accesses and reads uploaded folder 1, the folder badge value of folder 1 becomes 0.

Thereafter, when user B or user C, who are each an authorized user, performs a folder update operation such as modification, change and file or memo addition on folder 1 and thus n folder update histories are generated, the file badge value of folder 1 visualized to user A before user A checks the update histories is n. When user A checks all the n folder update histories by opening folder 1 and reading generated or modified folders or files, the folder badge value of folder 1 visualized to user A changes to 0.

The folder badge manager 340 can detect folder or file modifications performed by an arbitrary user terminal 120 and update a user-independent folder modification history per file. Here, the user-independent folder modification history per file includes folder modification results of users with respect to each folder.

Here, update of a folder can include not only modifications and changes in settings of the folder but also update histories generated in subfolders included in the folder and update histories generated in files included in the folder.

Update of a folder can refer to direct modifications or changes of settings or a state of the folder, such as change of the folder name, change of a folder participant and change of the authority of a folder participant, rather than folder update due to update of a file or a subfolder included in the folder.

When an update history is generated in a file included in a folder, the update history needs to be checked by a folder participant and thus generation of an unchecked update history with respect to a file is reflected in a folder badge value. A case in which a file has been newly generated, modified, changed or edited and a case in which the authority to access a file has been changed may be examples of an update history generated in a file.

That is, an update history generated in a file included in a folder can be regarded as one of update histories generated in the folder, an update history of a folder can include an update history of a file in the folder, and a file badge value of a file can be added to a folder badge value of a folder to which the file belongs.

When an update history is generated in a subfolder included in a folder, the update history is also included in details which need to be checked by a folder participant for a task associated with the folder. Accordingly, the number of unchecked update histories with respect to a subfolder is also reflected in computation of a folder badge value. That is, an update history generated with respect to a file in a subfolder as well as generation, modification and change of the subfolder are counted as update histories. In addition, the sum of update histories generated with respect to a subfolder can be at least a part of update histories of a folder to which the subfolder belongs. That is, update histories of a folder can include update histories of a subfolder included in the folder.

Therefore, according to an embodiment of the present invention, a badge value of a folder can be computed by summing up i) the number of unchecked update histories among update histories generated with respect to the folder (e.g., folder name changes, folder participant changes, etc.), ii) file badge values of files included in the folder and iii) badge values of subfolders included in the folder.

The file badge manager 350 can detect generation of update histories such as modifications and changes of a file by an arbitrary user terminal 120, calculate the number of unchecked update histories per user among update histories generated with respect to the file as a file badge value of the file, and generate a file badge corresponding to the badge value. Accordingly, the file badge manager 350 can generate and update a file badge using one or more of update histories with respect to a specific file, time information about update histories, identification information about users who have updated the file, identification information of users who have accessed the file, and information about a time at which a specific user has accessed the file.

Here, files managed by the file badge manager 350 can include not only general user files but also folder memo pads, folder chat rooms and task objects associated with folders or files. Generation and management of file objects with respect thereto will be described later with reference to FIG. 4.

The file badge manager 350 can accumulate, store and manage update histories with respect to a specific file, time information about the update histories, identification information about users who have updated the file, identification information about users who have accessed the file, and information about a time at which a specific user has accessed the file to generate a file modification history.

The folder badge manager 340 can also accumulate, store and manage update histories with respect to a file in a folder, time information about the update histories, identification information about users who have updated the folder or the file, identification information about user who have accessed the folder or the file, and information about a time at which a specific user has accessed the folder or the file, as described above, to generate a folder modification history.

Here, the folder modification history and the file modification history can be updated user-independently. A user-independent file modification history per file includes file modification results of users with respect to each file.

For example, when user A modifies file 1 in a folder, this affects all folder users who participate in the folder and thus a folder modification history per folder and a file modification history per file are independently updated per user.

The folder badge manager 340 can accumulate update histories corresponding to a period from the present to a specific time in the past or a specific number of update histories in a folder modification history per folder in a process of updating the folder modification history per folder. For example, the folder badge manager 340 can sequentially accumulate folder update dates a, b, c and d generated with respect to folder 1 in the folder modification history per folder. In addition, the folder badge manager 340 can store and manage update histories corresponding to a finite period from the current time or a finite number of update histories, for example, update histories generated for the past one year or three months or up to 100 update histories, and reflect the update histories in a folder badge.

When a folder update is detected during a process of updating the folder modification history per folder, the folder badge manager 340 can reflect user information of the corresponding user terminal 120 along with the folder update date in the folder modification history per folder.

For example, whenever a folder update such as file addition, file modification or folder modification occurs with respect to folder 1, the folder badge manager 340 can accumulate and store the folder update date and a user who generates the corresponding update history in the folder modification history per folder.

That is, when the number of unchecked modifications other than modifications checked or read by a specific user among a total number of modifications of a specific file is counted, the result value of counting becomes a badge value of the file displayed to the user. To this end, according to an embodiment, it is possible to compare a file modification time with a time at which the user has accessed the file most recently and to set the number of modifications accumulated after the time at which the user has finally accessed the file to a file badge value.

The file badge manager 350 can provide a file badge per user per file to the user terminal 120 such that the user terminal 120 visualizes a file badge for each of at least one file included in the corresponding folder in a process of displaying a file list with respect to the corresponding folder.

The file badge manager 350 detects reading of a file by the user terminal 120 and updates a badge with respect to the corresponding file of the corresponding user. In an embodiment, the file badge manager 350 can detect access of a user to a specific file, update a file access time per file, and update a file badge per file of the user.

For example, when the user terminal 120 of a user "Choi Jae-ho" opens or downloads a file in the name of "filter quality assurance method" with a file badge of "3" among files in a folder, the file badge manager 350 can update the file badge "3" of the file "filter quality assurance method" with respect to the user "Choi Jae-ho" to "0" and the folder badge manager 340 can reduce the folder badge value of the folder including the file by 3.

The file badge manager 350 can accumulate a file badge per file for a corresponding folder and a corresponding subfolder of a corresponding user on the basis of a file access time per file and a file modification history per file of the user and reflect the file badge per file in a file badge accumulation count in the folder.

The update notification unit 360 can provide a notification for notifying the user terminal 120 corresponding to each folder participant of generation of an update history with respect to a folder when an arbitrary user terminal 120 modifies or changes the folder or generates, modifies or changes a file or a subfolder in the folder and thus the update history with respect to the folder is newly generated.

More specifically, one of participants of a folder memo pad or a folder chat room associated with a folder may modify the folder memo pad or input a new chat message to the folder chat room. Here, the update notification unit 360 can immediately provide a notification message for indicating that an update history with respect to the folder has been newly generated separately from the operations of the folder badge manager 340 and the file badge manager 350 to calculate a folder badge value and a file badge value and update a folder badge and a file badge. Here, the notification message can be transmitted to user terminals 120 of folder participants other than the user who has generated the update history.

For example, when a folder user authorized to access a specific folder modifies a specific file in the folder, the update notification unit 360 can provide details of a folder update history. That is, information about the modified file in the folder are provided to the user terminals 120 of folder participants other than the user who has modified the file of generation of the folder update history. Thus, the update notification unit 360 can immediately provide, to one or more user terminals 120, a notification message including one or more of i) the fact that an update history has been generated, ii) information about an updated folder and iii) detailed information about the specific update history (e.g., update type, updated file name, and the like) through update notification.

The controller 370 can control the overall operation of the processor 210 and control data flow between the folder access manager 310, the folder list provider 320, the file list provider 330, the folder badge manager 340, the file badge manager 350, and the update notification unit 360.

The controller 370 may deliver data or signals between the folder access manager 310, the folder list provider 320 and the file list provider 330 for calculation of badge values of the folder badge manager 340 and the file badge manager 350 and activate or deactivate the folder access manager 310, the folder list provider 320 and the file list provider 330 to control the operations thereof.

The controller 370 may provide unchecked update histories displayed on folder badges or file badges or information about details of unprocessed tasks and priority among tasks while calculating and displaying badge values of folder badges and file badges. In this case, if there is a task object associated with a folder or a file, the controller 370 can use information about a task processing period included in the task object.

The controller 370 can detect statistical information on update histories generated in a corresponding folder, all subfolders and files in the folder, folder memo pads associated with the folder or files, folder chat rooms and task objects and reflect the statistical information in an accumulated statistics count with respect to the corresponding folder.

The controller 370 can perform a statistical operation on the basis of at least one of all folder memo pads and folder chat rooms associated with the corresponding folder and subfolders of the corresponding folder, task objects, the number of task objects generated through the folder memo pads or the folder chat rooms, the number of processed task objects, task orderers and task handlers. Further, the controller 370 can reflect the statistical operation result in the accumulated statistics count of the corresponding folder in a process of providing a folder list. The accumulated statistics count can be reflected in calculation of badge values of folder badges and displayed through the folder badges.

Further, the controller 370 can detect a task object which satisfies a remind condition from task objects generated through folder memo pads or folder chat rooms associated with a folder and substructures of the folder on the basis of task progress states and deadlines at specific intervals and provide a reminder to the user terminal 120.

That is, the controller 370 can select only tasks having task progress states and deadlines which satisfy predetermined conditions from unprocessed/unchecked tasks accumulated in a corresponding folder using information included in task objects to generate an urgent task list per user. Here, the urgent task list can be detected for the folder and all subfolders and files in the folder.

Accordingly, the controller 370 can notify present states of unchecked update histories through a folder badge per folder and particularly provide an urgent task list indicating tasks having imminent processing time limits to the user terminal 120. The user terminal 120 provided with the urgent task list can visualize the urgent task list through a reminder along with folder badges.

The controller 370 can search, filter or rearrange folders or content in folders on the basis of statistical information about unchecked update histories of folders at the request of the user terminal 120. For example, the controller 370 may arrange, at the request of the user terminal 120, folders or subfolders or files in a folder in descending order of the number of unchecked file updates or in order of imminent processing time limits per folder, in descending order of the number of unchecked folder memo pad updates (i.e., in descending order of folder memo badge values) or in descending order of the number of generated task objects or the number of task object updates (i.e., in descending order of task object badge values).

In addition, the controller 370 may provide a folder memo pad search function of searching for a specific folder memo pad among folder memo pads present in a folder or a substructure at the request of the user terminal 120.

Further, the controller 370 can accumulate statistical information about task objects associated with at least one file objects in a folder and a corresponding subfolder and reflect the accumulation result in a task object statics count in the folder. In an embodiment, the controller 370 can detect statistical information about a task object associated with a file object present in a corresponding folder and include the statistical information in an accumulated statics count.

For example, the controller 370 may perform a statistical operation on the basis of at least one of the number of generated task objects, the number of processed task objects, a corresponding associated task generator and task handler and reflect the statistical operation result in the accumulated statistics count of the corresponding folder. In addition, the accumulated statistics count can be reflected in folder badge computed during generation of a folder badge for the corresponding folder.

Figure 4:
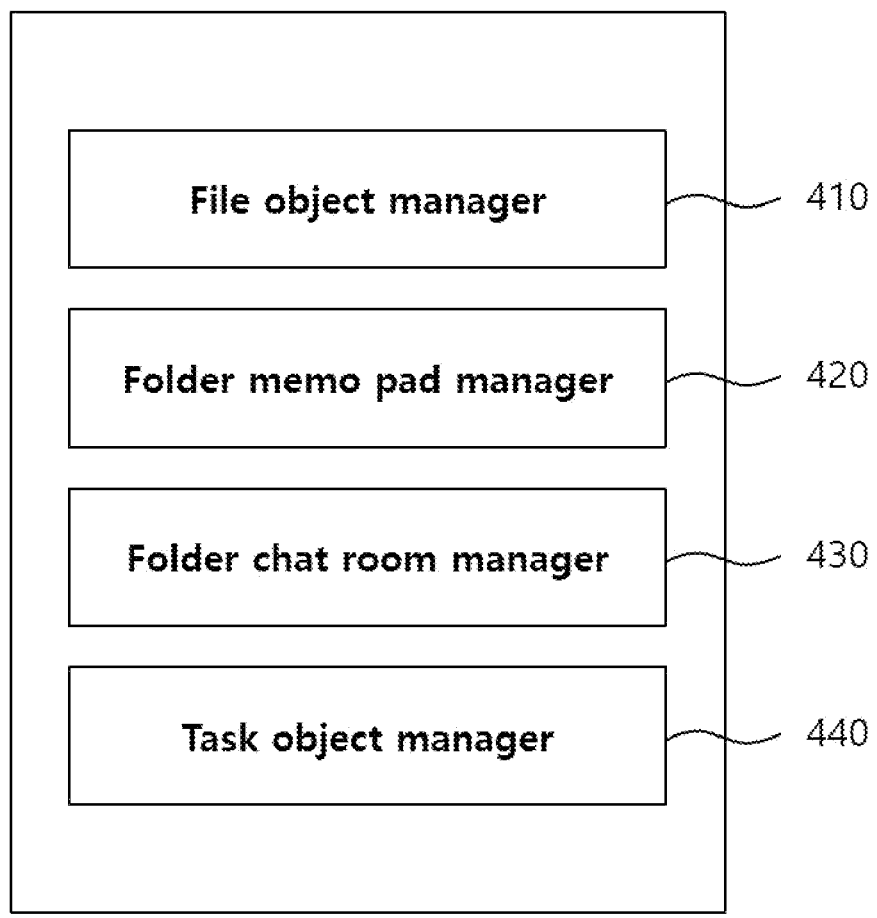
FIG. 4 is a block diagram showing a file badge manager of the processor in the folder management apparatus according to an embodiment of the present invention.

FIG. 4 is a block diagram showing the file badge manager 350 of the processor in the folder management apparatus according to an embodiment of the present invention.

Files managed by a file object manager 410 with respect to generation of file badges can refer to general text files transmitted between user terminals 120 or general user files such as multimedia files like moving images although they are not particularly limited.

The file object manager 410 can generate a user-independent file modification history with respect to a file and add a modification time, a file modifier and modified content to the file modification history whenever modification of the file is detected.

In one embodiment, the file object manager 410 can replicate files before and after being modified to a file modification tracking container of the file modification history to track modified content. In addition, the file object manager 410 can detect modification of the file on the basis of the original file and reflect the detection result in the file modification history.

Further, the file object manager 410 can generate a file badge per user indicating the number of unchecked updates per user on the basis of a user-independent file modification history with respect to a specific file.

The file object manager 410 can immediately update an access time record per user of the file modification history and a file badge per user computed therefrom whenever access to or modification of the specific file is detected in real time. In addition, the file object manager 410 can accumulate badge values of file badges generated for files, memo pads or chat rooms associated with the specific file and reflect the accumulated badge values in a file badge accumulation count of the file.

Here, when a badge value of a file badge exceeds a reference value, the controller 370 can recommend reading of the corresponding file to the user terminal 120 corresponding to the file badge.

A folder memo pad manager 420 can provide a folder memo pad in a process of providing a folder list and a folder badge per user per folder. Here, a folder memo pad is a memo pad associated with a folder, can be generated and accessed through the folder and supports functions of recording, sharing, modifying and tracking contents associated with the folder.

A folder memo pad is shared by one or more folder users and may include a link connected to a specific file in a folder, and a memo of the folder memo pad can be modified and tracked. An update history generated with respect to the folder memo pad may affect a badge value of the folder memo pad and a badge value of the associated folder.

In an embodiment of the present invention, a folder memo pad can be included in a file list or separately displayed as a file. Since a folder memo pad is a file, information about modification or update histories with respect to the folder memo pad can be provided to the user terminal 120 through a file badge for the folder memo pad. However, a file badge for a folder memo pad may be referred to as a folder memo badge for convenience of description and understanding.

In addition, the folder memo pad manager 420 checks the authority of the user terminal 120 to access a folder memo pad associated with a folder and provides the folder memo pad. More specifically, the folder memo pad manager 420 can provide a folder memo pad which can be generated, modified or deleted by at least one folder user authorized to access the corresponding folder and in which modification of memo content included in a folder memo can be tracked.

In the case a folder memo pad is associated with a file, an update history generated in the folder memo pad can be reflected in a file badge value of the associated file and a folder badge value of a folder including the file. When a folder memo pad is generated in association with a folder, the controller 370 can reflect generation of the folder memo pad in a folder modification history and update the folder badge value according to generation and update of the folder memo pad.

When a folder memo pad is generated in association with a specific file in a folder, generation of the folder memo pad can be reflected in a file modification history with respect to the file and a folder modification history of the folder including the file, and a file badge and a folder badge for the file and the folder can be updated according to generation and update of the folder memo pad.

The folder memo pad manager 420 can manage user information on a user who has modified a folder memo pad along with the modification time whenever an update history such as modification or change of the folder memo pad is detected and provide user information on a user who has modified a memo in a process of providing tracked memo content such that the user terminal 120 can display memo content modified by different users in different colors, fonts or sizes.

In another embodiment, the folder memo pad manager 420 can store and manage a file before being modified and a modified file when a folder memo pad is modified by the user terminal 120 and manage files according to modification of files corresponding to a period from the present to a specific time in the past or modification of a specific number of files.

Upon sensing or detecting the fact that the user terminal 120 has read a folder memo pad and an update history, the folder memo pad manager 420 may track modified memo content by searching for a modified file generated after the most recent access time at which the user corresponding to the user terminal 120 has accessed the folder memo pad and comparing content between the modified file and a file before being modified immediately before the file modification.

A folder chat room manager 430 can provide a folder chat room in a process of providing a folder list and a folder badge per user per folder. At least one folder user can share a folder chat room and participate therein. Here, a folder chat room is a chat room associated with a folder and that supports message conversations associated with the folder between users. Accordingly, users can input message threads for conversations through the folder chat room and check message threads input by other users in real time.

In embodiments of the present invention, a folder chat room can be included in a file list or separately displayed as a kind of file. Since a folder chat room is a file, information about modification or an update history with respect to the folder chat room can be provided to the user terminal 120 through a file badge for the folder chat room. However, the file badge for the folder chat room may be referred to as a folder chat room badge for convenience of description and understanding.

Further, the folder chat room manager 430 can check the authority of user terminals 120 to access a folder chat room associated with a folder and provide the folder chat room only to a user terminal 120 confirmed to have the authority to access the folder chat room. That is, the folder chat room manager 430 provides the chat room and message threads corresponding to the chat room such that the chat room associated with the folder can be substantiated and some or all of message threads input through the user terminal 120 can be displayed on the user terminal upon confirmation of the access authority of the user terminal 120.

More specifically, a folder chat room can be generated, deleted or read by at least one folder user authorized to access the corresponding folder, and message threads can be added to the chat room.

The folder chat room manager 430 can generate a folder chat room after a folder is generated by a folder generator and determine chatting participants who will participate in the folder chat room through user selection and designation of the folder generator. Here, the chatting participants may be folder users of the folder. Entrance/exit of chatting participants may affect increase/decrease in badge values of a folder chat room badge and a folder badge.

The folder chat room manager 430 can check the authority of the user terminal 120 to access folder chat rooms, select a folder chat room permitted to be accessed by the user terminal and provide a folder chat room list including information about the selected folder chat room and an access path to the selected folder chat room to the user terminal 120.

The folder chat room manager 430 can detect an update history with respect to a folder chat room and reflect the update history in a chat room modification history. Here, the folder chat room manager 430 can recognize addition of message threads to a folder chat room due to message input by other users, change in chatting participants of the folder chat room, transmission of a file or generation of a task object through the folder chat room, and the like as generation of update histories.

In addition, the folder chat room manager 430 can generate and update a file badge for the folder chat room, that is, a folder chat room badge, using the chat room modification history, user identification information and information on the time at which the user terminal accesses the folder chat room.

When a chat room is generated in association with a specific file in a folder, generation of the chat room can be reflected in the file modification history with respect to the file as well as the folder corresponding history with respect to the folder. In addition, the folder chat room manager 430 can update the file badge and the folder badge for the file and the folder including the file according to generation and update of the chat room.

A task object manager 440 includes one or more of a task orderer, a task handler and a task instruction from an arbitrary user terminal 120 and can receive task processing content through the task handler and generate a task object. Particularly, the task object manager 420 can receive task processing content which can be fed back through a task object and add the task processing content to the task object.

More specifically, the task object manager 440 can receive a task including information about at least one of task instruction created by a task orderer, a task handler, a task mark and a time limit from a user terminal 120 corresponding to the task orderer. Further, the task object manager 440 can encapsulate information about at least one of the task orderer, task handler, task instruction, task processing content, task mark and time limit of the task to generate a task object and associate the task object with a folder, a file or a folder memo pad.

In addition, information necessary to generate a task object can be received through a chat room, a folder memo pad or the like. In such a case, the task object may be generated through the chat room or the folder memo pad.

A task object can be stored in a folder or associated with a folder or a file in a folder as an independent task object message distinguished from a text message or a multimedia message. Further, a task object may be added to or associated with a folder memo pad or a task chat room.

Here, a task handler is a user designated by a corresponding task orderer as a subject that processes a corresponding task and may be one of a folder sharer and a folder participant. A task mark can include one or both of a reserved evaluation score indicating an upper limit of evaluation scores evaluated by the corresponding task orderer when the corresponding task is completed and an evaluation score indicating an actually evaluated score. Accordingly, the task orderer can easily order a task to a task handler through a folder and share task progress.

When a task object is generated through a folder memo pad or a task chat room, the task orderer can share the task object through the folder memo pad or the task chat room shared by participants of the folder memo pad or the task chat room according to an embodiment of the present invention. In addition, the task orderer can easily order a task, receive a task progress report and evaluate the task by delivering the task object to a task handler in the folder memo pad or the task chat room.

A user can perform a task according to feedback through a task object, and the state of the task object can be updated as the task proceeds. The task object manager 440 can update the state of a task object including a task progress state indicating a progress state per task processing step and particularly update the task object on the basis of feedback from a task handler.

In one embodiment, the task object manager 440 can update a task object in a folder memo pad by updating a predetermined task progress state on a task processing diagram which defines a task progress state per processing step on the basis of a request from one of a task orderer and a task handler and a response from the other.

Task progress through a task object, task object state change, task object state update and the like are recognized as generation of update histories with respect to the task object. Accordingly, the number of update histories which have not been read by a user among update histories with respect to the task object is calculated as a badge value of a task object badge. The task object manager 440 generates a task object badge on the basis of the task object badge value calculated through the aforementioned process. The task object badge value can be reflected in the folder badge value of a folder associated with the task object.

For example, task progress states may include "new" indicating a state in which a task object has been newly generated, "in progress" indicating a state in which a task handler is processing a corresponding task object, "done" indicating a state in which a task handler completes a task object and waits for interaction for completion of the task from a task orderer, and "confirm" indicating a state in which a task orderer has checked a task object completed by a task handler.

The task object manager 440 can update a task progress state of a task object through a task object related response obtained from a response relation between a target orderer and a target handler. Here, the task object related response corresponds to a response with respect to the task object which can be replied by a user terminal 120 associated with the task orderer or the task handler. In one embodiment, the task object related response may include at least one of a task confirmation response, a task completion response and a task evaluation response according to current task processing state of the corresponding task object.

For example, when the task object manager 440 updates a task progress state of a specific task object from "new" into "in progress", the file badge value for the task object increases by 1. Here, the task object manager 440 can update the state of the task object by receiving a task interaction or task feedback from the user terminal 120 of the task handler with respect to the task object. The task object manager 440 can perform progress of the task object, receive evaluation regarding the task object from a task orderer and assign the evaluation as a task mark of the task object. Input of the task mark through a task object can also be counted as one of update histories with respect to the task object.

The task object manager 440 can provide a remind message which is associated with the task object and request completion of the corresponding task progress state according to a specific repetition standard until the task progress state is completed to the user terminal 120 associated with the corresponding task handler or the task orderer as a notification message. Generation of a new remind message or notification message can also be counted as one of update histories with respect to the task object.

The file badge manager 350 or the task object manager 440 can detect a user associated with a file badge which exceeds a reference badge among file badges for users with respect to a specific file object, notify the user of update of the specific file object when the user logs in and provides an access link to the file object to recommend checking of update through the access link.

In one embodiment, when a file badge which exceeds a reference badge value (e.g., 10) is detected in a file modification history, the file badge manager 350 or the task object manager 440 can provide the names of other users who have modified the corresponding file after the user corresponding to the detected file badge finally access the file, the file badge and an access path for accessing the corresponding file object to the user terminal 120 of the user corresponding to the detected file badge as a reading recommendation message for recommending reading of the corresponding file.

Figure 5:
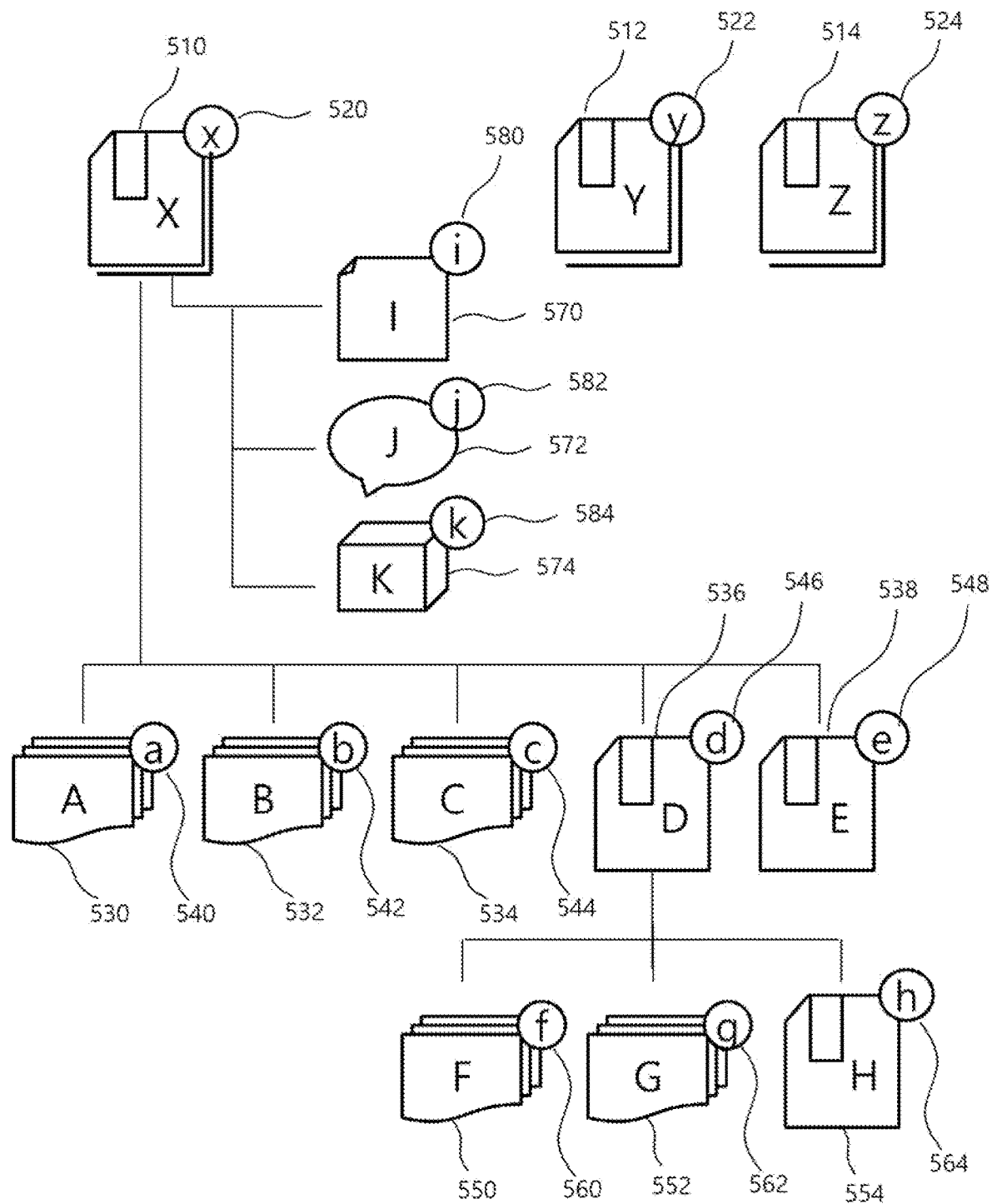
FIG. 5 is a diagram showing a folder list, files in folders and a list of subfolders along with badges according to an embodiment of the present invention.

FIG. 5 is a diagram showing a folder list and a list of files and subfolders in a folder along with folder badges and file badges according to an embodiment of the present invention.

FIG. 5 illustrates a folder list which can be displayed on a user terminal 120, a list of files in a folder and a list of subfolders in a file according to an embodiment of the present invention.

The folder list shown in FIG. 5 includes a folder X 510, a folder Y 512 and a folder Z 514. A folder badge 520 of the folder X 510 has a folder badge value of x, a folder badge 522 of the folder Y 512 has a folder badge value of y and a folder badge 524 of the folder Z 514 has a folder badge value of z.

In an embodiment described with reference to FIG. 5, the folder X 510 includes a file A 530, a file B 532, a file C 534, a first subfolder D 536 and a first subfolder E 538. A file badge of the file A 530 has a badge value of a, a file badge of the file B 532 has a badge value of b and a file badge of the file C 534 has a badge value of c. In addition, a first subfolder badge 546 of the first subfolder D 536 of the folder X 510 has a badge value of d and a first subfolder badge 548 of the first subfolder E 538 of the folder X 510 has a badge value of e.

Here, the first subfolder D 536 includes a file F 550, a file G 552 and a second subfolder H 554. A file badge 560 of the file F 550 has a badge value of f, a file badge 562 of the file G 552 has a badge value of g and a second subfolder badge 564 of the second subfolder H 554 has a badge value of h.

Further, the folder X 510 is associated with a folder memo pad 570, a folder chat room 572 and a task object 574. Here, a file badge of the folder memo pad 570, that is, a folder memo pad badge 580, has a badge value of i, a file badge of the folder chat room 572, that is, a folder chat room badge 582, has a badge value of j and a file badge of the task object 584, that is, a task object badge 584, has a badge value of k.

The folder badge value of the folder X 510 is x which means that the number of unchecked update histories associated with the folder X which need to be checked or read by a user when the user performs an associated task using the folder X. That is, x can include the number of unchecked update histories with respect to files, subfolders, folder memo pads, folder chat rooms and task objects included in or associated with the folder X 510.

In addition, unchecked update histories of the folder X 510 may further include unchecked update histories with respect to the folder itself among update histories with respect to the folder itself in addition to unchecked update histories with respect to subfolders or files. Update histories with respect to the folder itself may refer to occurrence of modification and change of information about settings or attributes of the folder irrespective of files or subfolders included in the folder.

Accordingly, x can be calculated by summing up a, b, c, d, e, i, j and k and can be equal to or greater than the sum of a, b, c, d, e, i, j and k, x may be a value obtained by adding the number of unchecked update histories among update histories with respect to settings or attributes of the folder X 510 to the sum of a, b, c, d, e, i, j and k.

The first subfolder badge value d of the first subfolder D 536 can be a value obtained by adding the folder badge value h of the second subfolder H 554 included in the first subfolder D 536 to the sum of the file badge values f and g of the file F 550 and the file G 552 in the first subfolder D. Alternatively, d may be a value obtained by adding the number of unchecked update histories generated for the first subfolder D 536 itself to the sum of f, g and h.

That is, when it is assumed that there is no update history with respect to the folder itself or update histories with respect to the folder itself are not added to the folder badge values, x and d can be calculated as follows.

$$x = a+b+c+d+e+i+j+k$$

$$d = f+g+h$$

Accordingly, when the user terminal 120 accesses the folder X 510, the folder badge value x may not be automatically subtracted. However, the folder badge value corresponding to the number of unchecked update histories among update histories with respect to the folder X (update histories generated with respect to the folder itself such as changes in folder settings or folder attributes such as the folder name and participants) can be subtracted only by access of the user terminal 120 to the folder X 510.

When the user terminal 120 accesses the folder memo pad I 570 associated with the folder X510 and checks all update histories with respect to the folder memo pad, the folder badge value corresponding to i can be subtracted from x. When the user terminal 120 accesses the folder chat room J 572 and checks all update histories of the chat room, the folder badge value corresponding to j can be subtracted from x. When the user terminal 120 accesses the task object K 574 and checks all update histories with respect to the task object, the folder badge value corresponding to k can be subtracted from x. That is, if there is an unchecked update history with respect to the folder, the folder badge value may not be automatically subtracted before it is determined that a user actually checks or reads a corresponding part. However, a folder badge value subtraction method may be set differently according to embodiments.

A folder badge value may be subtracted in the same manner with respect to a file or a subfolder. When the user terminal 120 accesses the file A 530 and checks all unchecked update histories with respect to the file A 530, a can be changed to 0 and the folder badge value x can be changed to x-a. This can be applied to the file B 532 and the file C 534 in the same manner.

When the user terminal 120 accesses the first subfolder D 536, the folder badge value corresponding to d can be immediately subtracted. However, according to an embodiment of the present invention, even after the user terminal 120 accesses the first subfolder D 536, the folder badge value x of the folder X 510 can be subtracted by f and g only when the user terminal 120 accesses the file F 550 and the file G 552 to read unchecked update histories.

FIG. 6 is a diagram illustrating an embodiment of a procedure in which the folder badge manager of the present invention manages folder update histories using a sequential list vectorized in time series.

In one embodiment, the folder badge manager 340 can manage a time stamp, that is, access time record information of the user terminal 120, as a time variable parameter per user per folder for each folder in the folder management system and reflect the time stamp in a folder badge per user per folder. Here, the time stamp can include one or more of a folder generation time, a folder last modified time and a folder last access time.

For example, the folder badge manager 340 can generate a folder badge per user per folder defined through a time stamp per user per folder, as shown in FIG. 6(*a*), and update the folder badge per user per folder whenever access to or modification of each folder is generated per user.

In addition, the folder badge manager 340 can compute and update a folder badge for each folder per user on the basis of a folder badge per user per folder updated in real time, as shown in FIG. 6(*b*). If a user A is a user of a user terminal 120 that requests access to a list of folders 1, 2 and 3, folder badges 0, 1 and 2 for the folders 1, 2 and 3 can be provided to the user terminal 120.

When the authority of the user terminal 120 associated with the user A to access the folder 1 is confirmed, the folder badge manager 340 can detect a generation time of 2017. 10. 21 12:08:51 and two modified times 2017. 10. 22 09:43:20 and 2017. 10. 25 11:08:22 from folder modified histories with respect to the folder 1, detect the last access time of 2017. 10. 22 09:43:20 of the user A and count one-time modification generated after the access time to compute the folder badge of the user A as 1. This means that, after the user A has last opened the folder, another user has updated the folder once.

Figure 7:
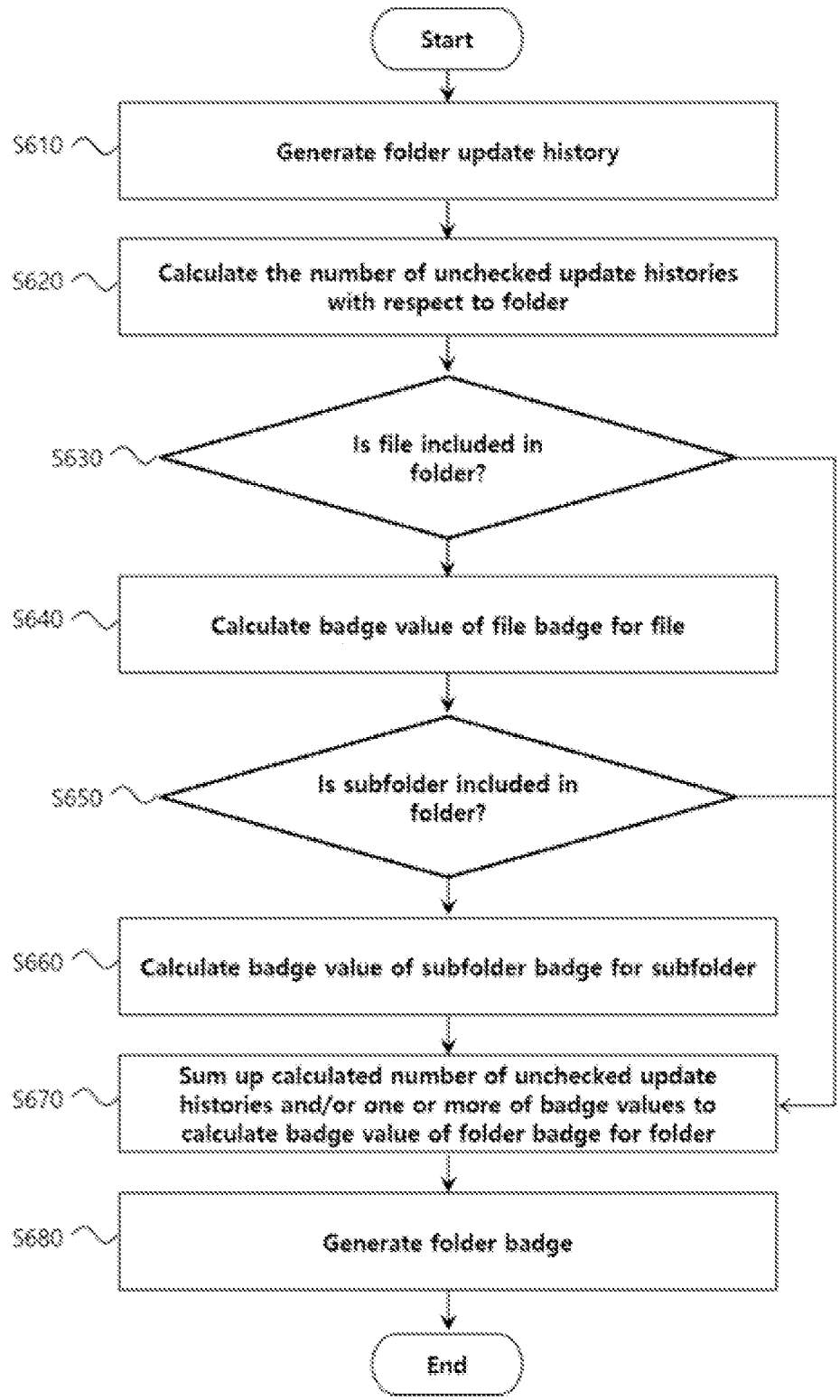
FIG. 7 is a flowchart showing a folder management method according to an embodiment of the present invention.

FIG. 7 is a flowchart showing a folder management method according to an embodiment of the present invention.

A process in which the folder management apparatus 110 according to an embodiment of the present invention generates a folder badge will be described with reference to FIG. 7. Here, the folder badge may be a symbol indicating the number or folder update histories which have not been read by a user terminal when a file permitted to be accessed by the user terminal is uploaded or updated to generate file update histories. In addition, in a specific folder, the number of folder update histories which have not been read by a user terminal may be a folder badge value displayed through the folder badge of the folder.

Update histories with respect to a folder are generated (S610). The folder management apparatus 110 calculates the number of update histories generated with respect to the folder and calculates the number of unchecked update histories per user (S620). Here, the number of update histories generated with respect to the folder, that is, update histories with respect to changes in attributes or settings of the folder, is calculated except update histories generated with respect to subfolders or files included in the folder.

In addition, the folder management apparatus 110 determines whether the folder includes content and whether an update history is generated in the content included in the folder. First, the folder management apparatus 110 determines whether the folder includes a file (S630).

When the folder includes a file, the folder management apparatus 110 can calculate a badge value of a file badge for the file. The badge value of the file badge for the file can be calculated by counting the number of update histories which are not checked by the user among the number of accumulated update histories generated with respect to the file. That is, the badge value of the file badge can be calculated by subtracting the number of update histories determined to be read by the user by accessing the file from the total number of accumulated update histories generated with respect to the file (S640).

Then, the folder management apparatus 110 determines whether the folder includes a subfolder (S650). When the folder includes a subfolder, the folder management apparatus 110 calculates a badge value of a subfolder badge by counting the number of unchecked update histories with respect to the subfolder (S660).

When the number of unchecked update histories generated with respect to the folder, the badge value of the file badge for the file in the folder, and the number of badge value of the subfolder badge for the subfolder in the folder have been calculated, the folder management apparatus 110 can calculate a badge value of a folder badge by summing up some or all of the numbers (S670).

The folder management apparatus 110 can generate the folder badge for the folder using the calculated badge value of the folder badge (S680) and provide the folder badge to the user terminal such that the folder badge can be displayed along with a folder list.

Figure 8:
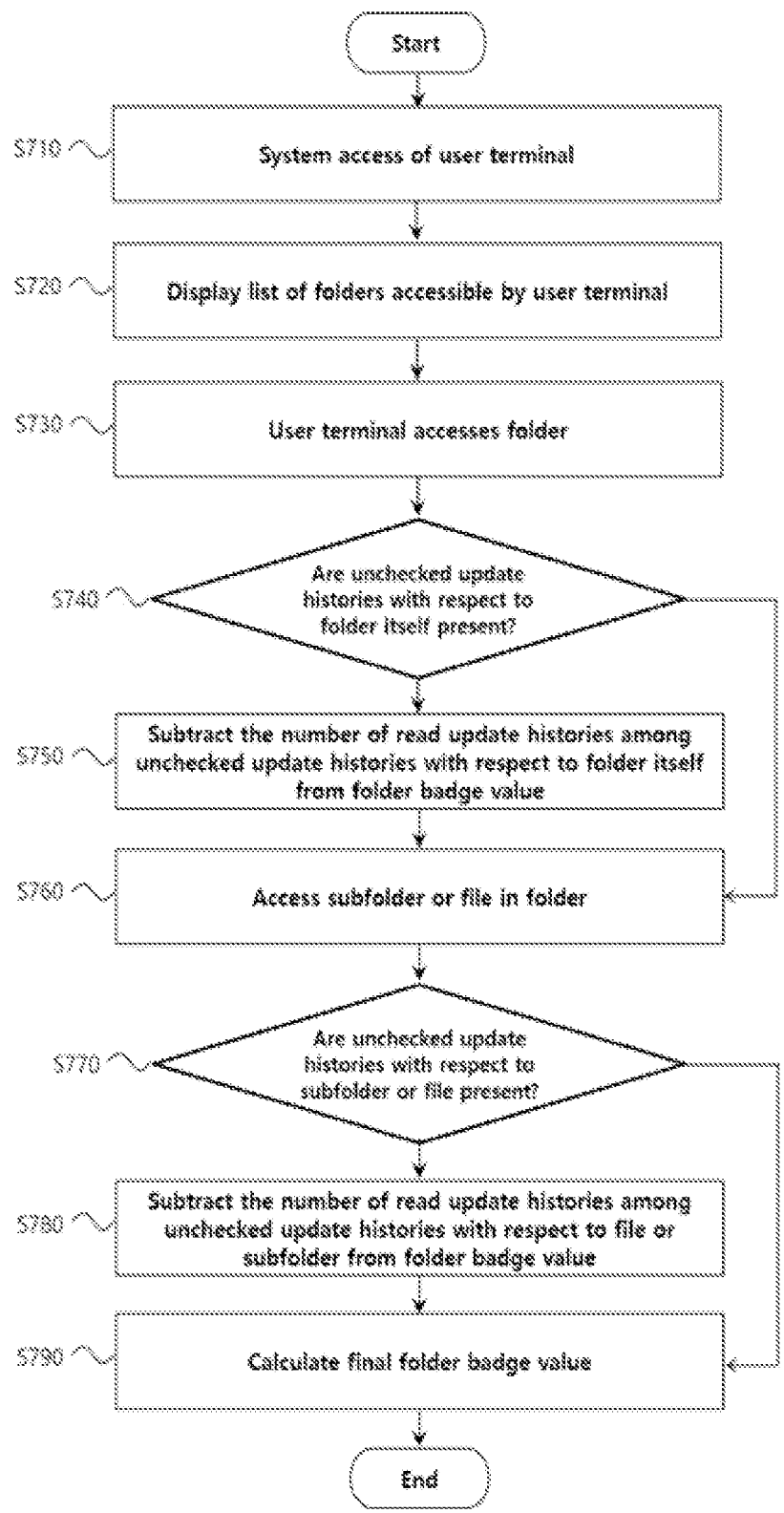
FIG. 8 is a flowchart showing a folder management method according to another embodiment of the present invention.

FIG. 8 is a flowchart showing a folder management method according to another embodiment of the present invention.

When a user terminal 120 accesses the folder management system, the folder management apparatus 110 detects the access of the user terminal 120 (S710). The folder management apparatus 110 checks user identification information and the range of the authority of the user terminal 120 and displays a folder list including folders accessible by the user terminal 120 (S720).

In this process, the folder management apparatus 110 can verify whether the user terminal is authorized to access a specific folder first. Here, user terminal information and user identification information of a user corresponding to the user terminal can be used. That is, the folder management apparatus 110 can receive or acquire the user identification information of the user corresponding to the user terminal 120 from the user terminal and check whether the user terminal 120 has the authority to access the folder management system and whether the user terminal 120 has the authority to access each folder in the system. In addition, the folder management apparatus 110 can display a folder list including folders confirmed to be accessible by the user terminal 120.

Here, when the folder list is displayed, folder badges of folders can also be displayed. The folder management apparatus 110 may select a folder recommended to be checked first according to priority to the user terminal 120 and provide information about a folder for which urgent processing or preferential checking is recommended.

For example, a folder for which urgent processing or preferential checking is recommended may be selected on the basis of a folder having a folder badge exceeding a predetermined reference value, a folder including a task object having an imminent processing time limit checked through information about task processing time limits included in task objects, and a folder in which the number of task objects or folder memo pads generated in association with the folder exceeds a predetermined reference value.

Thereafter, the user terminal 120 accesses one of the folders included in the displayed folder list (S730).

First, the folder management apparatus 110 determines whether the folder badge value will be subtracted only through access of the user terminal 120 to the folder. That is, the folder management apparatus 110 determines whether update histories generated with respect to the folder include an unchecked update history (S740). Although unchecked update histories accumulated with respect to a file or a subfolder included in the folder are not read only by accessing the folder, an unchecked update history due to change in settings or attributes of the folder before access of the user terminal 120 can be considered to be read when the user terminal 120 accesses the folder.

Accordingly, the number of unchecked update histories accumulated before the user terminal 120 accesses the folder among unchecked update histories with respect to the folder can be subtracted from the folder badge value when the user terminal 120 accesses the folder (S750).

Thereafter, the user terminal 120 can access a subfolder or a file in the folder (S760). The folder management apparatus 110 determines whether there are unchecked update histories with respect to the subfolder or the file (S770). If there are unchecked update histories with respect to the file, which have been accumulated before the user terminal 120 accesses the file, the user terminal accesses the file and reads the unchecked update histories, and the number of unchecked update histories can be subtracted from the folder badge value. If the user terminal 120 accesses the subfolder, when there are accumulated unchecked update histories with respect to the subfolder before the user terminal 120 accesses the subfolder and the user terminal 120 accesses the subfolder to read the unchecked update histories, the number of unchecked update histories read by the user terminal 120 can be subtracted from the folder badge value (S780).

Through the above-described process, when the user terminal 120 accesses the folder, the subfolder and the file to read unchecked update histories, the folder management apparatus 110 can calculate a final folder badge value according to access and reading of the user terminal 120 by subtracting the total number of read unchecked update histories from the folder badge value (S790). Then, the folder management apparatus can update the folder badge of the folder according to the calculated final folder badge value.

When unchecked update histories are accumulated after access of the user terminal 120, the folder badge value increases by the number of additionally accumulated unchecked update histories. That is, the folder management apparatus 110 can detect update histories with respect to a folder, reflect the update histories in a folder modification history, generate a folder badge using the folder modification history in which the update histories have been reflected, user identification information and information on the last access time of the user terminal 120 for the folder and continuously update the folder badge.

Although preferred embodiments of the present application have been described above, those skilled in the art will appreciate that various modifications and variations can be made in the present invention without departing from the spirit or scope of the invention described in the appended claims.

The folder management apparatus and method according to an embodiment of the present invention can provide intuitive notification to a user with respect to folder update of other users using the concept of the folder badge per user per folder.

In addition, it is possible to provide information updated in real time to users and provide convenience in folder management for each user by increasing or decreasing a file badge value or a folder badge value according to whether an event has been checked per user.

What is claimed is:

1. An apparatus for managing a folder, the apparatus comprising:
   a memory; and
   a processor electrically connected to the memory,
   wherein the processor is configured to
   detect access of a user terminal,
   provide a folder list for folders or a file list for files in a folder,
   when an access authority of the user terminal to the folder is confirmed, display some or all of message threads input from chat room participants through a folder chat room realized in association with the folder in the user terminal, and
   when a folder generation request is received from the user terminal, generate a specific folder which a user associated with the user terminal designates as a folder generator, and determine at least one folder participant who participates in the specific folder by inviting a folder sharer by designating the folder generator.

2. The apparatus of claim 1, wherein the processor displays a chat between users for contents related to the folder as a message thread through the folder chat room.

3. The apparatus of claim 1, wherein the processor adds the folder chat room to the file list as one of the files in the folder or separately displays the folder chat room.

4. The apparatus of claim 1, wherein the processor provides folders with the access authority of the user terminal to the folder list, and provides a folder badge corresponding to each folder jointly with the folder list.

5. The apparatus of claim 1, wherein the processor reflects an update history generated in the folder chat room to a file badge of a file associated with the folder chat room.

6. The apparatus of claim 5, wherein when an update history including events for upload, modification, addition, change, and/or update of a specific file, the processor reflects and displays a number of unchecked update histories which are not read or checked by a user in a number of accumulated update histories for the specific file to the file badge.

7. The apparatus of claim 1, wherein the processor assigns the access authority of the folder generator including a folder delete authority to the folder generator, and assigns the access authority of the folder sharer from which the folder delete authority is excluded to the at least one folder participant.

8. The apparatus of claim 1, wherein when the access authority to the folder of the user terminal is confirmed, the processor provides a list of lower folders in the folder and metadata regarding a lower folder, and provides a lower folder badge corresponding to the lower folder jointly.

9. The apparatus of claim 1, wherein the processor selects the folder chat room of which access by a user is permitted by checking the access authority of the user terminal, and provides a folder chat room list including information on the selected folder chat room and an access path.

10. The apparatus of claim 1, wherein when one of participants of the folder chat room inputs a new chat message, the processor updates a folder badge and a file badge by calculating a folder badge value and a file badge value.

11. The apparatus of claim 1, wherein when an update history for the folder is generated, the processor immediately provides a notification message for notifying that the update history is generated to the user terminal.

12. The apparatus of claim 1, wherein when the folder chat room is generated in association with the folder and a plurality of files is included in the folder, the processor processes the folder chat room in association with the plurality of files.

13. A folder management method performed by a folder management apparatus including a memory and a processor electrically connected to the memory, the method comprising:
   detecting access of a user terminal;
   providing a folder list for folders or a file list for files in a folder;
   when an access authority of the user terminal to the folder is confirmed, displaying some or all of message threads input from chat room participants through a folder chat room realized in association with the folder in the user terminal; and
   when a folder generation request is received from the user terminal, generating a specific folder which a user associated with the user terminal designates as a folder generator, and determining at least one folder participant who participates in the specific folder by inviting a folder sharer by designating the folder generator.

14. A non-transitory computer-readable medium having embodied thereon a program, which when executed by a computer causes the computer to execute a folder management method, the method comprising:
   detecting access of a user terminal;
   providing a folder list for folders or a file list for files in a folder;
   when an access authority of the user terminal to the folder is confirmed, displaying some or all of message threads input from chat room participants through a folder chat room realized in association with the folder in the user terminal; and
   when a folder generation request is received from the user terminal, generating a specific folder which a user associated with the user terminal designates as a folder generator, and determining at least one folder participant who participates in the specific folder by inviting a folder sharer by designating the folder generator.

* * * * *